United States Patent Office 3,190,883
AMINOALKANOL DERIVATIVES OF PIPERAZINES
Charles F. Geschickter, Lorton, and John S. Pierce, Richmond, Va., Ebenezer E. Reid, Baltimore, Md., and Ying H. Chen, Richmond, Va., assignors to The Geschickter Fund for Medical Research, Inc., Washington, D.C., a corporation of New York
No Drawing. Filed Oct. 5, 1962, Ser. No. 228,743
11 Claims. (Cl. 260—268)

The present invention relates to the preparation and uses of a novel set of polyaminoalkanols and, more specifically, it relates to a group of polyaminoalkanols which can be represented by the following generic formula:

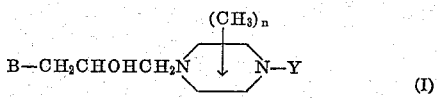
(I)

wherein B is a member of the group consisting of (1) morpholino, (2) pyrrolidino, (3) piperidino, (4) methylcyclohexylamino, (5) piperazino of the structure

(II)

wherein Y is an alkyl radical of 1 to 6 carbons, and (6)

wherein R and R' each is an alkyl radical of 1 to 4 carbons; wherein X is a member of the group consisting of H and CHO; and $n$ is a number from 0 to 4 both in structures (I) and (II); no carbon in the piperazine rings of structures (I) and (II) having more than one methyl group attached to it.

The compounds of the present invention are valuable intermediates for the formation of useful industrial and pharmaceutical chemicals. An important specific use of these compounds is as intermediates to form useful fungicidal agents. In addition, the compounds of the present invention are relatively non-toxic and are active pharmacologically. The particular clinical uses depend on the structure of (I), as B, X and $n$ vary.

A primary object of the present invention is to provide novel polyaminoalkanols having both pharmaceutical and non-pharmaceutical utility.

Another important object of the present invention is to provide novel polyaminoalkanols having the general formula

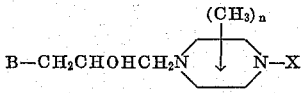

wherein B, $n$ and X have the values previously mentioned.
Still another important object of the present invention is to provide compounds which are low in toxicity and are useful medicinally, a specific such medicinal utility being as motor relaxants.

A further object of the present invention is to provide useful chemical intermediates of the structure

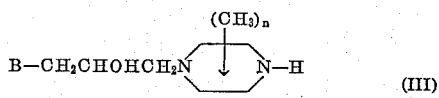
(III)

wherein B and $n$ have the values previously mentioned.
A still further object of the present invention is to provide intermediates of the structure

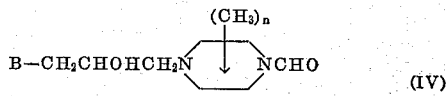
(IV)

wherein B and $n$ have the values previously mentioned and which can be hydrolyzed to form the compounds of structure (III).

Another object of the present invention is to provide intermediates of structure (III) containing the active group >N—H, which reacts with Lewis acids, as halohydrins, epoxides, high molecular weight acid chlorides and other Lewis acids well known to those skilled in the art of organic synthesis to yield useful industrial and pharmaceutical chemicals. An application of this object is in the formation of useful chelating agents.

A still further object of the present invention is to provide intermediates for the formation of compounds of the structure

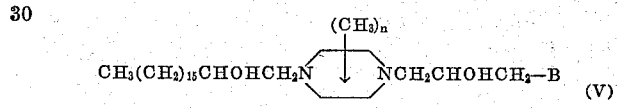
(V)

wherein B and $n$ have the values previously mentioned, which combine with $Cu^{++}$ to form useful fungicidal agents.

Another object of the present invention is to provide intermediates to react with compounds such as $$BrCH_2CHOH(CH_2)_8COOCH_3$$

to form compounds which can be hydrolyzed with sodium hydroxide to form sodium salts of high molecular weight chelating agents which with $Cu^{++}$ form useful fungicides.

The following reaction can be used to prepare the compounds of the present invention:

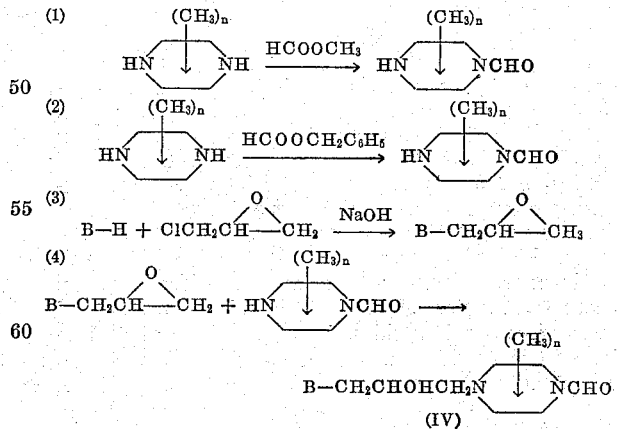

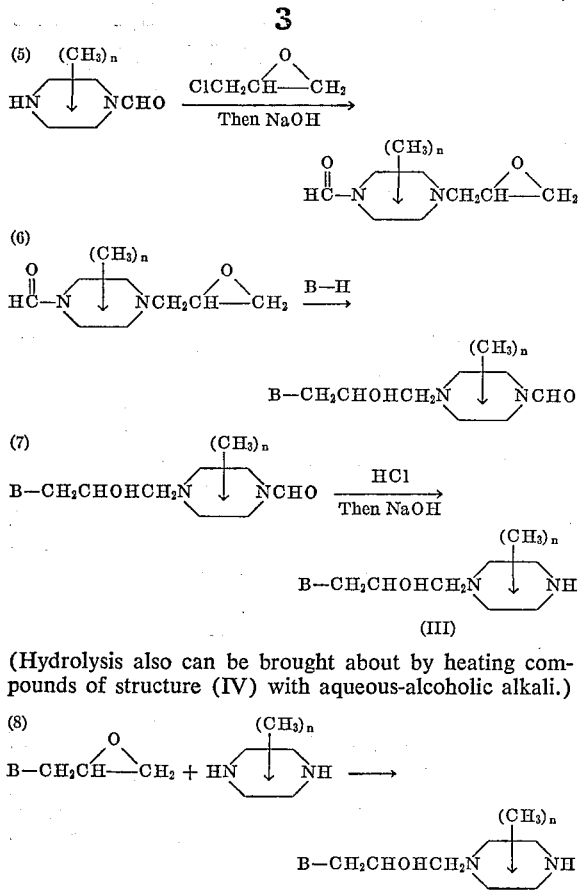

(Hydrolysis also can be brought about by heating compounds of structure (IV) with aqueous-alcoholic alkali.)

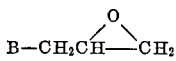

Equation 4 can be used for the preparation of all compounds of structure (IV), Equation 6 being preferred for the preparation of such compounds when B is $(CH_3)_2N$. All compounds of structure (III) can be prepared by Equations 7 and 8. Syntheses involving Equations 3, 4, 5, 6, 7 and 8 are given in the illustrative examples.

The N-methylpiperazine used in the present specification was purchased. The other N-alkylpiperazines were synthesized, either by reaction of the alkyl halide (usually bromide) with the piperazine or the reaction of the alkyl halide with the N-formylpiperazine and the cleavage of the formyl group.

The N-formylpiperazines used in the examples were prepared by the reaction of approximately equimolar quantities of the piperazine and methyl formate, by the method of Kiichi et al. [(1) Kiichi Fujii, Koichi Tomino and Hiroyasu Watanbe, J. Pharm. Soc. Japan, 74, 1049–51 (1954); C.A. 49, 11666f (1955)]. In the reaction of piperazine, 2-methylpiperazine, cis-2,5-dimethylpiperazine and 2,6-dimethylpiperazine no solvent was used. For the formylation of trans-2,5-dimethylpiperazine and 2,3,5,6-tetramethylpiperazine, isopropanol was used as solvent.

The epihydrinamines,

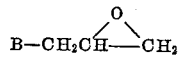

are prepared by reaction of approximately equimolar quantities of secondary amine (B—H) and epichlorhydrin, preferably in the presence of a trace of water, and by treatment of the reaction product with concentrated alkali (viz., approximately 33% NaOH solution). When extremely reactive amines, such as pyrrolidine or N-methylpiperazine are used, external cooling, vigorous stirring and slow addition of reagents tend to increase the yield of epihydrinamine. Since some of the epihydrinamines may react almost explosively when distilled in the presence of traces of certain impurities, the preparation and distillation of two typical epihydrinamines are set forth in the examples.

While it is possible to use either crude or distilled epihydrinamines in Equations 4 and 8, better results are obtained when the distilled epoxide is used. In the illustrative examples, distilled epihydrinamines were used except when otherwise indicated. None of the epihydrinamines of the structure

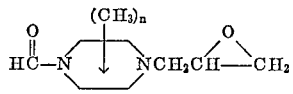

were distilled, however.

The following examples and tables are given to illustrate the present inventions and are not to be regarded as limiting the inventions in any way. (All temperatures used in this specification are on the centigrade scale.)

Examples 1 and 2 illustrate the formation of the epihydrinamines according to Equation 3.

EXAMPLE 1

To a solution of 2 ml. of water in 50.0 g. (0.50 mole) of N-methylpiperazine at about 20° C. was added 47.0 g. (0.51 mole) of epichlorohydrin over a period of one hour. The reaction mixture, kept at a temperature of about 26°, was stirred for 3 additional hours. A solution of 25 g. (0.62 mole) of sodium hydroxide in 50 ml. of water was added in 1.5 hours, the temperature being kept below 30°.

The upper layer was separated by decantation and was extracted with portions of ether, 200 ml. and 100 ml., respectively. The combined extracts were dried over potassium hydroxide pellets in the refrigerator for 18 hours. The supernatant liquid was decanted and filtered into a short-necked distilling flask. On vacuum evaporation of the ether and vacuum distillation of the residue, there was obtained 33.9 g. of 3-(4-methylpiperazino)-1,2-epoxypropane, boiling at 115–117° at 22 mm. pressure. (Calcd. for $C_8H_{16}N_2O$: N, 18.0%. Found, 17.5%.)

EXAMPLE 2

To a mixture of 46.7 g. (0.50 mole) of epichlorohydrin and 1.5 ml. of water was added, over a period of 1.5 hours, 36.5 g. (0.51 mole) of pyrrolidine, the temperature being kept at about 12°. The reaction mixture was stirred for four additional hours, the temperature being maintained at 20–22°. A cold solution of 24 g. (0.60 mole) of sodium hydroxide in 50 ml. of water was added slowly and stirring was continued for another hour. The reaction mixture had two layers, each of which was very soluble in water. The upper layer was decanted off and the lower layer was extracted with 300 ml. of ether. The ethereal solution was combined with the upper layer and dried over potassium hydroxide pellets in the refrigerator for 18 hours. The ether solution was vacuum evaporated and the residue was vacuum distilled from a hot water bath. The yield of 3-pyrrolidino-1,2-epoxypropane, boiling at 68–70° at 13.3 mm., was 29.0 g. (Calc. for $C_7H_{13}NO$: N, 11.0%. Found 11.0%.)

As stated previously, either crude or distilled epihydrinamines can be used in Equations 4 and 8. The crude epihydrinamines can be used in ether solution or the ether can be evaporated, leaving the epihydrinamine as residual liquid.

Compounds of structure (IV) can be prepared by the following general method:

In a typical preparation, an equimolar mixture of an epihydrinamine of structure

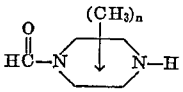

and a formylpiperazine of the structure is allowed to stand at room temperature for a few days and is heated for approximately 10 hours on a steam bath. The reaction product of structure (IV) is obtained by vacuum distillation.

The reaction of the epihydrinamine and the formylpiperazine is carried out with a solvent, such as 95% ethanol, or with no solvent. When ethanol is used as a solvent for the initial reaction, it can be removed by evaporation in the process of heating the reaction mixture.

This procedure for preparing the compounds of structure IV (exemplified in Equation 4) is illustrated in Examples 3–18 which follow.

EXAMPLE 3

A mixture of 6.4 g. (0.05 mole) of 1-formyl-3-methylpiperazine (with some 1-formyl-2-methylpiperazine) and 6.5 g. (0.05 mole) of 3-diethylamino-1,2-epoxypropane was allowed to stand at room temperature for four days. The mixture was heated on a steam bath for 10 hours and was vacuum distilled. The yield of 1-formyl-4-(3-diethylamino-2-hydroxypropyl)-3-methylpiperazine (and the 2-methyl isomer), boiling at 165–166° at 0.80 mm. pressure, was 7.0 g.

EXAMPLE 4

1 - formyl-4-(3-piperidino-2-hydroxypropyl)piperazine, boiling at 187–190° at 0.60 mm. pressure, was obtained in yield of 40 percent, by allowing a mixture of equimolar quantities of N-formylpiperazine and 3-piperidino-1,2-epoxypropane to stand for two weeks, heating on a water bath for 8 hours and vacuum distillation.

EXAMPLE 5

A mixture of 8.5 g. (0.060 mole) of 1-formyl-cis-2,5-dimethylpiperazine and 10 g. (0.06 mole) of 3-(methylcyclohexylamino)-1,2-epoxypropane and 50 ml. of 95 percent ethanol was allowed to stand for one week and then was heated in a water bath at approximately 75° for 8 hours. On vacuum distillation, the reaction mixture yielded 11.0 g. of 1-formyl-4-[3-(methylcyclohexylamino)-2-hydroxypropyl]-cis-2,5-dimethylpiperazine, boiling at 189–191° at 0.15 mm. pressure.

EXAMPLE 6

1-formyl-4-(3-morpholino - 2 - hydroxypropyl)-cis-2,5-dimethylpiperazine, boiling at 178–180° at 0.20 mm. pressure, was obtained in a yield of 55 percent by vacuum distillation of the reaction product of equimolar amounts of 1-formyl-cis-2,5-dimethylpiperazine and 3-morpholino-1,2-epoxypropane, after 7 days' standing and 14 hours' heating on a steam bath.

EXAMPLE 7

A mixture of 193.5 g. (1.50 moles) of 3-diethylamino-1,2-epoxypropane and 227 g. (1.59 moles) of 1-formyl-cis-2,5-dimethylpiperazine was stirred mechanically in a liter round bottom flask for 4 hours, as the temperature was maintained below 35°. The stirring was continued overnight, as the flask was cooled in a tap water bath. The mixture was allowed to stand at room temperature for 7 days and was heated at 75° for 6 hours and at 63° for 20 hours. The reaction mixture was subjected to vacuum distillation. The yield of 1-formyl-4-(3-diethylamino-2-hydroxypropyl)-cis-2,5-dimethylpiperazine, boiling at 144–146° at 0.18 mm. pressure, was 140 g.

EXAMPLE 8

A mixture of 7.8 g. (0.051 mole) of 3-(2-methylpiperidino)-1,2-epoxypropane, 6.4 g. (0.05 mole) of 1-formyl-3-methylpiperazine (with a trace of isomer) and 10 ml. of 95% ethanol was allowed to stand at room temperature for one week and then was heated on a water bath for 8 hours. The resulting reaction mixture was distilled under reduced pressure to yield 6.8 g. of

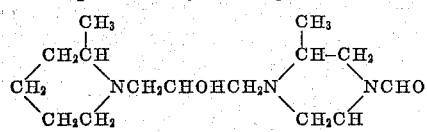

(with a trace of 2-methyl isomer) boiling at 198–200° at 0.75 mm. pressure.

EXAMPLE 9

A mixture of 14.2 g. (0.12 mole) of N-formylpiperazine, 17.2 g. (0.12 mole) of 3-morpholino-1,2-epoxypropane and 50 ml. of 95 percent ethanol was allowed to stand for 5 days and then was heated at approximately 75° for 8 hours. On vacuum distillation, 1-formyl-4-(3-morpholino-2-hydroxypropyl)piperazine, boiling at 172–175° at 0.15 mm. pressure, was obtained in a yield of 15.5 g.

EXAMPLE 10

A mixture of 10.0 g. (0.088 mole) of N-formylpiperazine and 15.3 g. (0.09 mole) of 3-methylcyclohexylamino-1,2-epoxypropane was allowed to stand at room temperature for two weeks and then was heated on a steam bath for 8 hours. The reaction mixture was distilled under reduced pressure. There was obtained 7.0 g. of 1-formyl-4-(3-methylcyclohexylamino - 2-hydroxypropyl)-piperazine, boiling at 218–220° at 0.80 mm. pressure.

EXAMPLE 11

A mixture of 6.4 g. (0.05 mole) of 1-formyl-3-methylpiperazine (with some 1-formyl-2-methylpiperazine) and 7.0 g. (0.055 mole) of 3-pyrrolidino-1,2-epoxypropane was allowed to stand for 17 days and then was heated on a steam bath for 8 hours. On vacuum distillation, 4 g. of 1-formyl-4-(3-pyrrolidino-2-hydroxypropyl)-3-methylpiperazine (with some 1-formyl-4-(3-pyrrolidino-2-hydroxypropyl)-2-methylpiperazine) was obtained, boiling at 187–189° at 0.90 mm. pressure.

EXAMPLE 12

On vacuum distillation, 7.5 g. of 1-formyl-4-[3-(2-methylpiperidino)-2-hydroxypropyl]-trans-2,5 - dimethylpiperazine, boiling at 187–190° at 0.35 mm. pressure, was obtained from the reaction mixture of 7.1 g. (0.05 mole) of 1-formyl-trans-2,5-dimethylpiperazine and 8.8 g. (0.057 mole) of 3-(2-methylpiperidino)-1,2-epoxypropane, which was mixed, allowed to stand for 10 days and heated on a steam bath for 12 hours.

EXAMPLE 13

A mixture of 8.5 g. (0.05 mole) of 1-formyl-2,3,5,6-tetramethylpiperazine and 7.5 g. (0.058 mole) of 3-diethylamino-1,2-epoxypropane was allowed to stand for a month and was heated for 6 hours on a steam bath. The reaction mixture was extracted with ether. The solvent was removed by vacuum evaporation and the residue was vacuum distilled. There was obtained 4.8 g. of 1-formyl-4-(3-diethylamino-2 - hydroxypropyl) - 2,3,5,6-tetramethylpiperazine, boiling at 165–168° at 0.40 mm. pressure.

EXAMPLE 14

A mixture of 8.5 g. (0.050 mole) of 1-formyl-2,3,5,6-tetramethylpiperazine and 7.5 g. (0.052 mole) of 3-morpholino-1,2-epoxypropane was let stand for 2 weeks at room temperature and then was heated on a steam bath for 20 hours. On vacuum distillation, 1-formyl-4-(3-morpholino-2-hydroxypropyl)-2,3,5,6 - tetramethylpiperazine, boiling at 165–168° at 0.15 mm. pressure, was obtained in a yield of 4.0 g.

EXAMPLE 15

A mixture of 11.4 g. (0.10 mole) of N-formylpiperazine, 18.5 g. (0.10 mole) of 3-(di-n-butylamino)-1,2-epoxypropane and 2 drops of water was allowed to stand for one week and then was heated on a steam bath for 10 hours. The reaction mixture, on vacuum distillation, yielded 16.5 g. of 1-formyl-4-[3-(di-n-butylamino)-2-hydroxypropyl]piperazine, boiling at 168–170° at 0.18 mm. pressure.

EXAMPLE 16

1-formyl-4-[3-(4-methylpiperidino)-2-hydroxypropyl]-cis-2,5-dimethylpiperazine, boiling at 185–187° at 0.30 mm. pressure, was obtained in a yield of 53% by reaction of equimolar quantities of 1-formyl-cis-2,5-dimethylpiperazine and 3-(4-methylpiperidino)-1,2-epoxypropane.

EXAMPLE 17

A mixture of 11.0 g. (0.077 mole) of 1-formyl-3,5-dimethylpiperazine (containing traces of 1-formyl-2,6-dimethylpiperazine) and 10.0 g. (0.078 mole) of 3-diethylamino-1,2-epoxypropane was allowed to stand for two weeks and then was heated on a steam bath for 8 hours. The reaction mixture was distilled under reduced pressure. The yield of 1-formyl-4-(3-diethylamino-2-hydroxypropyl)-3,5-dimethylpiperazine (with traces of 1-formyl-4-(3-diethylamino-2-hydroxypropyl)-2,6 - dimethylpiperazine), boiling at 170–172° at 0.75 mm., was 6.0 g.

EXAMPLE 18

To 11.4 g. (0.08 mole) of 1-formyl-cis-2,5-dimethylpiperazine was added 20.3 g. (approximately 0.08 mole) of crude 3-(4-hexyl-cis-2,5-dimethylpiperazine)-1,2-epoxypropane. The reaction mixture was shaken frequently and was allowed to stand for 15 days. It then was heated for 12 hours at approximately 70°. On distillation, 10 g. of 1-formyl-4-[3-(4-n-hexyl-cis - 2,5 - dimethylpiperazine)-2-hydroxypropyl]-cis-2,5-dimethylpiperazine,

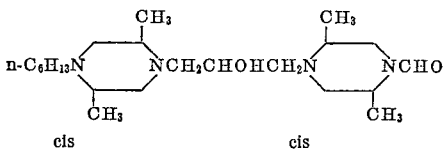

boiling at approximately 216–210° at 0.35 mm., was obtained. [Calcd. for $C_{22}H_{44}N_4O_2$ (titrable nitrogen): N, 10.60. Found, 10.80.]

The crude epihydrinamine,

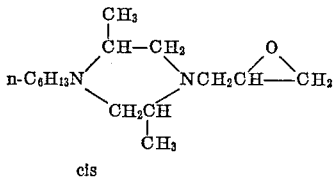

was prepared as follows:

To 111 g. (0.56 mole) of 1-hexyl-cis-2,5-dimethylpiperazine was added 56 g. (0.60 mole) of epichlorohydrin. The reaction mixture was cooled in an ice bath and was let stand at room temperature for 6 days. Then 26 g. (0.65 mole) of sodium hydroxide, in 30 ml. of water, was added, the mixture was shaken thoroughly and allowed to stand for 2 days. The reaction mixture then was diluted with 100 ml. of water and was extracted with two 400 ml. portions of ether. The ether solution was dried over potassium hydroxide pellets for 5 days in the refrigerator. On evaporation of the ether in a rotary evaporator at room temperature, there was obtained 114 g. of oil, crude 1-(2,3-epoxypropyl)-4-n-hexyl-cis-2,3-dimethylpiperazine.

The following general procedure, with slight modification, which follows the steps of Equations 5 and 6, is applicable to the preparation of all the compounds of structure (IV) of the present specification.

To a stirred solution of formylpiperazine of the structure

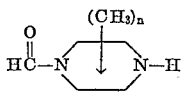

in approximately five volumes of 95% ethanol, a quantity of epichlorohydrin equimolar to the formylpiperazine is added slowly. The reaction mixture is stirred for about three hours, the temperature being kept at 25–27°. A solution of 50% aqueous sodium hydroxide, containing base approximately 1.25 times the number of moles of the formylpiperazine, is added slowly with stirring. The stirring is continued for about one hour. A quantity of amine of structure B–H approximately double the molar quantity of the formylpiperazine is added with cooling and stirring. The mixture is allowed to stand at room temperature overnight and is heated gently on a steam bath or sand bath for approximately 8 hours. The reaction product of structure (IV) is obtained by vacuum distillation. Illustrations of this procedure are set forth in Examples 19–22.

EXAMPLE 19

To a stirred solution of 28.5 g. (0.20 mole) of 1-formyl-cis-2,5-dimethylpiperazine in 150 ml. of 95 percent ethanol, 18.8 g. (0.20 mole) of epichlorohydrin was added slowly. The reaction mixture was stirred for 3.5 hours, the temperature being kept at 25–27°. Then a solution of 10 g. of sodium hydroxide, dissolved in 20 ml. of water, was added slowly and stirring was continued for one hour. To this reaction mixture 50 ml. of dimethylamine (25 percent in water) was added, with cooling and stirring, the temperature being kept at 32° for 1.5 hours. The reaction mixture was filtered and the product, 1-formyl-4-(3-dimethylamino-2-hydroxypropyl)-cis-2,5-dimethylpiperazine, boiling at 152–154° at 9 mm. pressure, was obtained in a yield of 22% in an aliquot sample, on vacuum evaporation and vacuum distillation of the residue.

EXAMPLE 20

A mixture of 17.2 g. (0.10 mole) of 1-formyl-2,3,5,6-tetramethylpiperazine and 9.3 g. (0.10 mole) of epichlorohydrin was allowed to stand for one week, with frequent mixing. The reaction mixture was dissolved in 30 ml. of 95 percent ethanol and 15 ml. of 1-butanol was added. The reaction mixture was evaporated to low volume in a vacuum evaporator. The residual product was mixed vigorously with 100 ml. of 6 N sodium hydroxide solution and extracted with 100 ml. of ether. The ether solution was diluted with ether to 100 ml. and a 40 ml. portion was mixed with 50 ml. of dimethylamine (25 percent in water). The reaction mixture was allowed to stand overnight and then was heated on a water bath for 24 hours. The reaction mixture was extracted with 100 ml. of ether and the ether solution was filtered, the ether removed by vacuum evaporation and the residue was vacuum distilled. The yield of 1-formyl-4-(3-dimethylamino-2-hydroxypropyl) - 2,3,5,6 - tetramethylpiperazine, boiling at 142–145° at 0.45 mm., was 0.80 g.

EXAMPLE 21

A mixture consisting of approximately 0.05 mole of crude 1-formyl-4-(2,3-epoxypropyl)-cis-2,5-dimethylpiperazine and 0.10 mole of diethylamine with no solvent stood at room temperature for 12 hours and was heated gently on a sand bath for 8 hours. The reaction mixture was distilled under reduced pressure. The yield of 1-formyl-4-(3-diethylamino-2-hydroxypropyl) - cis - 2,5 - dimethylpiperazine, boiling at 168–170° at 0.65 mm. pressure, was 10.0 g.

EXAMPLE 22

A mixture consisting of 0.05 mole of crude 1-formyl-4-(2,3-epoxypropyl)-cis-2,5-dimethylpiperazine and 0.10 mole of morpholine stood at room temperature for 12 hours and was heated gently on a sand bath for 8 hours. The reaction mixture was vacuum distilled. The yield of 1-formyl-4-(3-morpholino-2-hydroxypropyl) - cis - 2,5-dimethylpiperazine, boiling at 182–185° at 0.25 mm. pressure, was 4.0 g.

Following are data relative to various compounds of structure (IV) made in accordance with the present invention:

Table A

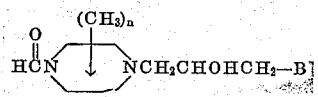

| n | B | °C. | B.P., mm. Hg | Titrable calcd. | Nitrogen, percent* found |
|---|---|---|---|---|---|
| 0 | Di-isopropylamino | 176°–181° | 0.40 | 10.32 | 10.10 |
| 0 | Ethylbutylamino | 178°–180° | 0.75 | 10.32 | 9.96 |
| 0 | Di-n-butylamino | 168°–170° | 0.18 | 9.35 | 9.26 |
| 0 | Morpholino | 172°–175° | 0.15 | 10.89 | 10.56 |
| 0 | Methylcyclohexylamino | 218°–220° | 0.80 | 9.88 | 9.59 |
| 0 | Pyrrolidino | 188°–190° | 0.60 | 11.61 | 11.48 |
| 0 | Piperidino | 187°–190° | 0.60 | 10.97 | 10.71 |
| 0 | 2-methylpiperidino | 183°–184° | 0.50 | 10.40 | 10.21 |
| 0 | 3-methylpiperidino | 180°–182° | 0.70 | 10.40 | 10.14 |
| 0 | 2,6-dimethylpiperidino | 200°–206° | 0.60 | 9.89 | 9.69 |
| 1 | Diethylamino | 165°–166° | 0.80 | 10.88 | 11.18 |
| 1 | Di-n-propylamino | 192°–193° | 0.70 | 9.81 | 9.67 |
| 1 | Di-n-butylamino | 190°–192° | 0.75 | 8.94 | 8.65 |
| 1 | Morpholino | 184°–186° | 0.15 | 10.32 | 10.00 |
| 1 | Methylcyclohexylamino | 201°–202° | 0.25 | 9.42 | 9.13 |
| 1 | Pyrrolidino | 187°–189° | 0.90 | 10.97 | 10.93 |
| 1 | Piperidino | 195°–196° | 0.50 | 10.40 | 10.38 |
| 1 | 2-methylpiperidino | 198°–200° | 0.75 | 9.88 | 9.40 |
| 1 | 3-methylpiperidino | 183°–185° | 0.50 | 9.88 | 10.01 |
| 1 | 2,6-dimethylpiperidino | 204°–207° | 0.50 | 9.42 | 9.60 |
| 2 c | Dimethylamino a | 152°–154° | 9.00 | 11.51 | 11.57 |
| 2 c | Diethylamino a | 168°–170° | 0.65 | 10.32 | 10.00 |
| 2 c | ----do---- | 144°–146° | 0.18 | 10.32 | 10.31 |
| 2 d | ----do---- | 170°–172° | 0.75 | 10.32 | 10.26 |
| 2 c | Di-n-propylamino | 178°–179° | 0.90 | 9.35 | 9.55 |
| 2 b | Di-isopropylamino | 158°–160° | 0.20 | 9.35 | 9.47 |
| 2 c | ----do---- | 178°–184° | 0.50 | 9.35 | 8.98 |
| 2 c | Ethylbutylamino | 193°–195° | 0.75 | 9.35 | 9.34 |
| 2 c | Di-n-butylamino | 193°–195° | 0.60 | 8.55 | 8.60 |
| 2 c | Morpholino | 178°–180° | 0.20 | 9.82 | 9.47 |
| 2 a | ----do---- | 182°–185° | 0.25 | 9.82 | *10.04 |
| 2 c | Methylcyclohexylamino | 189°–191° | 0.15 | 8.99 | 8.68 |
| 2 c | Pyrrolidino a | 173°–175° | 0.15 | 10.40 | 10.68 |
| 2 c | Piperidino | 198°–200° | 0.50 | 9.88 | 10.02 |
| 2 b | 2-methylpiperidino | 187°–190° | 0.35 | 9.42 | 9.97 |
| 2 d | ----do---- | 185°–186° | 0.45 | 9.42 | 8.98 |
| 2 c | 4-methylpiperidino | 185°–187° | 0.30 | 9.42 | 9.23 |
| 2 c | 2,6-dimethylpiperidino | 206°–208° | 0.50 | 8.99 | 9.00 |
| 4 | Dimethylamino a | 142°–145° | 0.45 | 10.32 | 10.00 |
| 4 | ----do---- | 165°–168° | 0.40 | 9.35 | 9.46 |
| 4 | Morpholino | 165°–168° | 0.15 | 8.94 | 9.03 |
| 4 | 2-methylpiperidino | 186°–188° | 0.25 | 8.61 | 8.52 |
| 4 | 3-methylpiperidino | 183°–185° | 0.45 | 8.61 | 8.24 |
| 4 | 4-methylpiperidino | 172°–175° | 0.25 | 8.61 | 8.00 |

NOTE.—All compounds in Table A were prepared by Equation 4 unless otherwise indicated.

a Equation (6).
b Trans-2,5-dimethyl.
c Cis-2,5-dimethyl.
d 3,5-Dimethyl (or 2, 6-methyl).
* Titrated with perchloric acid in glacial acetic acid.

Not only are the compounds of structure (I) useful intermediates, as will be discussed more specifically hereinafter, but many of them are of value clinically. For example, the compounds of structure

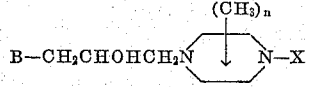

are medicinally useful as motor relaxants when B is a member of the group made up of morpholino, pyrrolidino, piperidino, monomethylpiperidino, 2,6-dimethylpiperidino, methylcyclohexylamino and

where R and R′ each is an alkyl radical of 1 to 4 carbons; X is CHO; and n is a number from 0 to 4. These compounds have extremely low toxicities, ranging usually from 350 to 500 mg./kg. in LD 50. Except when B is pyrrolidino, these compounds may be administered orally three times daily in doses of 30–100 mg., or a corresponding dosage intramuscularly once daily. The oral dosage of the pyrrolidino species should be 25–50 mg.

Such compounds are useful medicinally either as the free base or the therapeutically acceptable acid addition salt. The free bases are very soluble in oil base and the acid addition salts are highly soluble in water. Examples of therapeutically acceptable salts are the hydrochloride, sulfate, phosphate, acetate, lactate, tartrate, citrate, maleate, etc. In general, those non-toxic salts of the free bases which are soluble in water or other well tolerated solvents are particularly useful for therapeutic purposes due to the ease of administration of the salts in their dissolved form. In addition, other non-toxic salts may also be used.

Variations in the structure of (I), within the limits just prescribed, give compounds particularly suited for special uses as muscle relaxants. For example, compounds of the structures

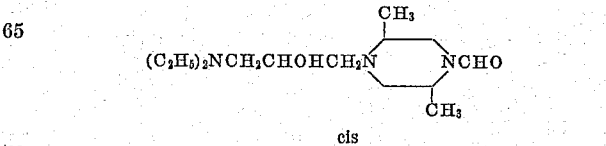

cis

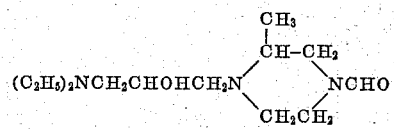

mixed with some of the 2-methyl isomer,

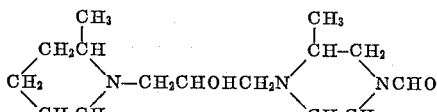

mixed with some of the 2-methyl isomer, and

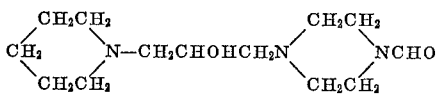

are particularly useful for gastro-intestinal spasm, the dosage being as previously indicated.

Compounds of the structure

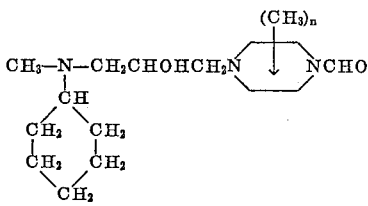

not only are useful muscular relaxants but also are mild tranquilizers. The dosage for such purpose is as previously indicated.

The drug

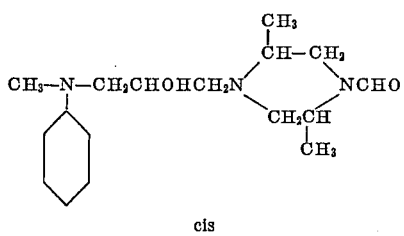

cis is particularly useful as a tranquilizer. It has an LD 50 of 350 mg./kg. It may be made up in aqueous solution as the hydrochloride to a concentration of free base of 50 mg./ml. Orally, it may be used in capsules as the free base in 50% sesame oil or as an acid addition salt, i.e., as the hydrochloride.

Compounds of structure

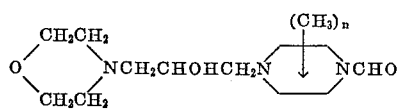

relieve coughs caused by minor irritation of the lungs, the dosage being the same as recited in connection with the motor relaxants previously mentioned.

An important use of compounds of structure

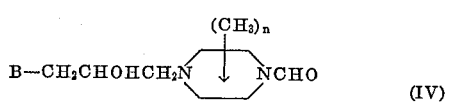           (IV)

is based on the fact that they can be hydrolyzed to form the useful intermediates of the structure

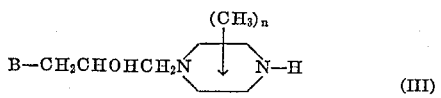           (III)

The formyl group can be split off by hydrolysis with a strong acid, such as hydrochloric acid, or by a strong base, such as sodium or potassium hydroxide. Aqueous alcohol, with enough alcohol to hold the formyl derivative in solution, is a satisfactory solvent for basic hydrolysis. However, complete initial solubility is not necessary for hydrolysis to take place.

All the compounds of structure (IV) are soluble in dilute acids, such as hydrochloric acid, so no alcohol is necessary in the acid hydrolysis, although it was used in some cases. Cleavage of the formyl group from compounds of structure (IV) can be carried out by heating with hydrochloric acid. A convenient solution for this purpose is 2 N hydrochloric acid but more dilute or more concentrated solutions can be used.

The free bases of structure (III) are obtained from the reaction mixtures, after acid hydrolysis, by treatment with excess sodium hydroxide solution. For the isolation of free bases of very low molecular weight, which are very soluble in water, evaporation of the acid solution to low volume before treatment with base greatly increases the yield. Also, regardless of the method of hydrolysis, the solubility of the free base of structure (III) in water can be decreased appreciably by the addition of solid sodium hydroxide.

The compounds of structure (IV) which are to be hydrolyzed to (III) can be prepared either by Equation 4 or Equation 6. Equation 4 is the method of choice unless B is $(CH_3)_2N$, in which case Equation 6 is the preferred method of synthesis.

In the preparation of compounds of structure (III) from (IV), either purified or crude formyl derivatives can be used. Usually, the use of the crude product is the method of choice.

Examples 23–28 will illustrate methods of hydrolysis of (IV), such methods being exemplified by Equation 7 previously set forth (in certain cases, the description will include details of preparation of the materials utilized in these methods in accordance with one or more of the methods previously described).

EXAMPLE 23

To 13.6 g. (0.05 mole) of 1-formyl-4-(3-diethylamino-2-hydroxypropyl)-cis-2,5-dimethylpiperazine, in a 500 ml. round bottom flask, was added slowly, with shaking, 200 ml. of 2 N hydrochloric acid. The reaction mixture was refluxed gently for 18 hours on a Glas-col. The reaction mixture then was cooled and extracted with 200 ml. of ether. The ether extract was discarded and the aqueous layer was made strongly basic with 6 N sodium hydroxide solution. An oil rose to the surface. This oil was extracted with two 200 ml. portions of ether. The ether extracts were combined and evaporated in a rotary evaporator. The oily residue on distillation yielded 1-(3-diethylamino-2-hydroxypropyl)-cis-2,5-dimethylpiperazine, boiling at 99–100° at 0.15 mm. pressure.

A sample of the same 1-formyl-4-(3-diethylamino-2-hydroxypropyl)-cis-2,5-dimethylpiperazine, on being hydrolyzed with aqueous alcoholic sodium hydroxide solution, yielded 1-(3-diethylamino-2-hydroxypropyl)-cis-2,5-dimethylpiperazine, boiling at 101–102° at 0.05 mm. pressure. The identity of this compound and the compound just above, boiling at 99–100° at 0.15 mm. pressure, was proved by the infrared spectra of the two samples.

EXAMPLE 24

1-(3-di-n-propylamino - 2 - hydroxypropyl) - cis-2,5-dimethylpiperazine, boiling at 136–139° at 0.90 mm. pressure, was obtained by hydrolysis of 1-formyl-4-(3-di-n-propylamino-2-hydroxypropyl)-cis-2,5-dimethylpiperazine in about ten volumes of aqueous potash (23% by weight).

EXAMPLE 25

A mixture of 0.20 mole each of 1-formyl-cis-2,5-dimethylpiperazine and 3-piperidino-1,2-epoxypropane in 150 ml. of 95% ethanol was allowed to stand overnight and was refluxed for 8 hours. Then 280 ml. of 2 N hydrochloric acid was added and the refluxing was continued for 3.5 hours and the alcohol was removed by vacuum evaporation. The residue was treated with excess sodium hydroxide solution and was extracted with ether. The ether was removed by vacuum evaporation and the residual liquid was vacuum distilled. The yield of 1-(3-piperidino-2-hydroxypropyl)-cis-2,5-dimethylpiperazine, boiling at 135–138° at 0.15 mm., was 33 g.

EXAMPLE 26

A mixture of 86.6 g. (0.61 mole) of 1-formyl-cis-2,5-dimethylpiperazine, 106.8 g. (0.58 mole) of 3-di-n-butylamino-1,2-epoxypropane and 100 ml. of 95% ethanol was heated in a water bath for 5 hours and was allowed to stand at room temperature for 10 days before being worked up. The reaction mixture was poured into 1 liter of water and the oily upper layer was separated and dissolved in 1200 ml. of 2 N hydrochloric acid. The aqueous solution was refluxed gently overnight, cooled and extracted with 150 ml. of ether. The ether layer was discarded and the aqueous layer was made strongly basic with aqueous alkali. The oily layer was extracted into 250 ml. of ether. On vacuum evaporation of the ether and vacuum distillation of the residue, there was obtained 80 g. of 1-(3-di-n-butylamino-2-hydroxypropyl)-cis-2,5-dimethylpiperazine, boiling at 220–226° at 29 mm. pressure.

EXAMPLE 27

(a) By reaction of equimolar amounts of 1-formyl-cis-2,5-dimethylpiperazine and 3-morpholino-1,2-epoxypropane in a volume of alcohol approximately double that of the combined reactants, and by hydrolysis of the formed 1-formyl-4-(3-morpholino-2-hydroxypropyl)-cis-2,5-dimethylpiperazine with aqueous alcoholic potassium hydroxide, 1-(3-morpholino-2-hydroxypropyl)-cis-2,5-dimethylpiperazine, boiling at 221–223° at 28 mm. pressure, was obtained in a yield of 56%.

(b) Another sample of crude 1-formyl-4-(3-morpholino-2-hydroxypropyl)-cis-2,5-dimethylpiperazine, on hydrolysis with approximately 2 molar sulfuric acid and treatment with excess base, yielded 1-(3-morpholino-2-hydroxypropyl)-cis-2,5-dimethylpiperazine, boiling at 223° at 29.5 mm. pressure.

EXAMPLE 28

1-(3-di-n-butylamino-2-hydroxypropyl)-trans-2,5-dimethylpiperazine, boiling at 207–209° at 29 mm. pressure, was obtained from crude 1-formyl-4-(3-di-n-butylamino-2-hydroxypropyl)-trans-2,5-dimethylpiperazine, by hydrolysis with an aqueous-alcohol solution approximately N in hydrochloric acid and treatment with excess base.

In addition, all of the compounds of structure

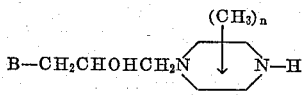

of the present invention can be prepared by Equation 8, as illustrated in Examples 29 to 39.

EXAMPLE 29

A mixture of 169 g. (1.00 mole) of 3-(methylcyclohexylamino)-1,2-epoxypropane and 149 g. (1.31 moles) of cis-2,5-dimethylpiperazine was allowed to stand at room temperature for 3 days and then was heated on a steam bath for 12 hours. The reaction mixture, on vacuum distillation, yielded 114.5 g. of 1-(3-methylcyclohexylamino-2-hydroxypropyl)-cis-2,5-dimethylpiperazine, boiling at approximately 160–163° at 0.75 mm. pressure.

EXAMPLE 30

A mixture of 8.5 g. (0.05 mole) of 3-(methylcyclohexylamino)-1,2-epoxypropane, 5.0 g. (0.05 mole) of 2-methylpiperazine and 25 ml. of 95% ethyl alcohol was allowed to stand at room temperature for 4 days and was heated gently on a sand bath for 10 hours. On vacuum distillation, the reaction mixture yielded 7 g. of 1-(3-methylcyclohexylamino-2-hydroxypropyl)-3-methylpiperazine (mixed with some of the 2-methylpiperazine isomer) boiling at 158–163° at 0.20 mm. pressure.

EXAMPLE 31

A mixture of 168 g. (1.30 moles) of 3-diethylamino-1,2-epoxypropane and 228 g. (2.00 moles) of cis-2,5-dimethylpiperazine was allowed to react in a water bath at 30° for 3 hours and then was heated on a steam bath for 20 hours wth frequent mixing. The reaction mixture was distilled under reduced pressure, yielding 220 g. of 1-(3-diethylamino-2-hydroxypropyl)-cis-2,5-dimethylpiperazine, boiling at 126–128° at 0.80 mm. pressure.

The compound

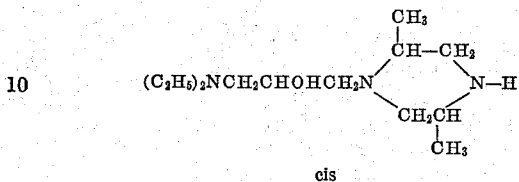

was found to be particularly valuable as a central nervous stimulant. The compound prepared as above described was occasionally purified with a water pump, but an oil pump, at a recorded pressure of about 0.05 mm. to about 0.80 mm., was used most of the time.

In another run, 1-(3-diethylamino-2-hydroxypropyl)-cis-2,5-dimethylpiperazine, prepared as just above, had a boiling point of 103–106° at 0.11 mm. pressure. A comparison of the infrared spectra of this sample and the samples, boiling at 99–100° at 0.15 mm. pressure and 100–102° at 0.05 mm. pressure, prepared in a previous experiment by acid and base hydrolysis of

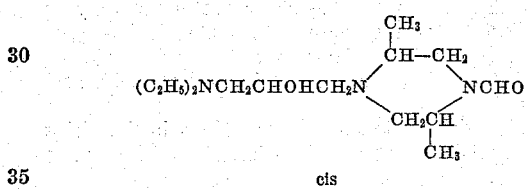

proves the identity of the three samples.

EXAMPLE 32

A solution of 51.3 g. (0.45 mole) of cis-2,5-dimethylpiperazine and 42.5 g. (0.30 mole) of 3-piperidino-1,2-epoxypropane in 100 ml. of 95% ethanol was heated in a water bath at 40° for 5 hours and then at 60–65° for 3 hours. On removal of the solvent by vacuum evaporation and on vacuum distillation of the residue there was obtained 30 g. of 1-(3-piperidino-2-hydroxypropyl)-cis-2,5-dimethylpiperazine, boiling at approximately 157–160° at 0.20 mm. pressure.

EXAMPLE 33

To 362 ml. of an ether solution of 1.00 mole of crude 3-dimethylamino-1,2-epoxypropane was added slowly, with shaking, 171 g. (1.50 mole) of cis-2,5-dimethylpiperazine. After one hour, 150 ml. of 95% ethanol was added. The reaction mixture was allowed to stand for 2 days. Volatile solvents were removed in an evacuated rotary evaporator. The residue, on vacuum distillation, yielded 42 g. of 1-(3-dimethylamino-2-hydroxypropyl)-cis-2,5-dimethylpiperazine, boiling at approximately 104–108° at 0.32 mm. pressure.

EXAMPLE 34

A mixture of 13.0 g. (0.10 mole) of 3-diethylamino-1,2-epoxypropane, 22.8 g. (0.20 mole) of 2,6-dimethylpiperazine and 20 ml. of 95% ethanol was allowed to stand at room temperature for 10 days and was heated in a water bath for 10 hours. On vacuum distillation, the reaction mixture yielded 18.0 g. of 1-(3-diethylamino-2-hydroxypropyl)-3,5-dimethylpiperazine (with a trace of the 2,6-dimethyl isomer), boiling at 175–177° at 23 mm. pressure.

EXAMPLE 35

A mixture of 8.58 g. (0.060 mole) of 3-morpholino-1,2-epoxypropane and 11.44 g. (0.080 mole) of 2,3,5,6- tetramethylpiperazine was allowed to stand overnight and then was heated on a steam bath for 30 hours. On vacuum distillation of the reaction product, there was obtained 13.5 g. of 1 - (3-morpholino-2-hydroxypropyl)-2,3,5,6-tetramethylpiperazine, boiling at approximately 158–159° at 0.35 mm. pressure.

EXAMPLE 36

A mixture of 156 g. (1.0 mole) of 3-(4-methylpiperazino-1,2-epoxypropane and 228 g. (2.0 mole) of cis-2,5-dimethylpiperazine in a 1 liter flask was allowed to stand, with occasional shaking for 11 days. At the end of this time the reaction mixture had become very viscous. It was then heated for 8.5 hours with occasional shaking, on a water bath at 80°. On vacuum distillation, there was obtained 174 g. of

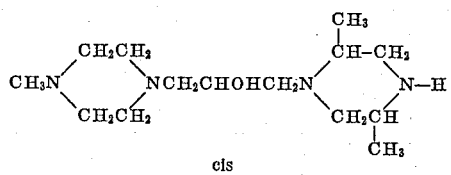

boiling at 160–164° at 0.60 mm. pressure.

This product, 1-[3-(4-methylpiperazino) - 2 - hydroxypropyl]-cis-2,5-dimethylpiperazine, is useful not only as an intermediate for the synthesis of valuable industrial and pharmaceutical chemicals, but it also is useful in medicine. It has a low toxicity and is a valuable central nervous stimulant.

The following compounds were obtained in the yields indicated by the method described just above in Example 36:

Table B

| Compound | Yield, percent |
|---|---|
| CH₃N⟨CH₂CH₂⟩NCH₂CHOHCH₂N⟨CH₂CH₂⟩—H with CH₂CH₃ substituent | 42 |
| CH₃N⟨CH₂CH₂⟩NCH₂CHOHCH₂N⟨CH₂CH⟩—H with CH₃ substituent (with some of the 2-methyl isomer) | 64 |
| CH₃N⟨CH₂CH₂⟩NCH₂CHOHCH₂N⟨CH₂CH⟩—H trans, with CH₃ substituent | 44 |
| CH₃N⟨CH₂CH₂⟩NCH₂CHOHCH₂N⟨CH₂CH⟩—H with CH₃ substituent (with some of the 2,6-dimethyl isomer) | 75 |
| CH₃N⟨CH₂CH₂⟩NCH₂CHOHCH₂N⟨CH—CH⟩—H with CH₃ CH₃ substituents | 30 |

The boiling points and analyses of these dipiperazinopropanols are given in Table C.

EXAMPLE 37

To 8.0 g. (0.04 mole) of crude 3-(4-butylpiperazino)-1,2-epoxypropane in 50 ml. of ether was added 9.0 g. (0.079 mole) of cis-2,5-dimethylpiperazine. The products were mixed thoroughly and were left standing in an uncovered flask for 3 days and then were heated gently on a sand bath for 5 hours. The reaction mixture then was dissolved in ether and the insoluble residue was discarded. The ether was evaporated and the oily residue was vacuum distilled. The yield of

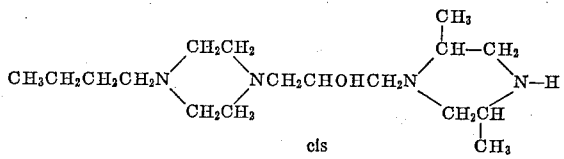

boiling at 160–170° at 0.20 mm. pressure, was 6.0 g.

EXAMPLE 38

To 7.1 g. (0.030 mole) of crude 3-(4-n-hexyl-2-methylpiperazino)-1,2-epoxypropane in 50 ml. of ether was added 7.0 g. (0.067 mole) of 2,6-dimethylpiperazine. The products were mixed thoroughly and were left standing in an open flask for 3 days. Then the mixture was heated gently on a sand bath for 1 day. The mixture was dissolved in 95% ethanol, treated with excess sodium hydroxide solution and extracted with ether. On evaporation of the ether and vacuum distillation of the residue, there was obtained 2.5 g. of

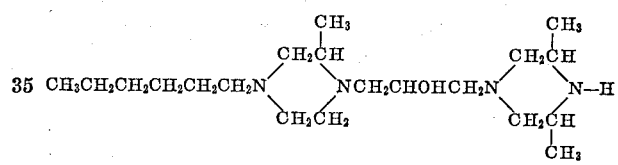

boiling at 180–190° at 0.28 mm. pressure. There were also traces of other isomers present.

EXAMPLE 39

(a) The bis-piperazinopropanol, mainly of the structure

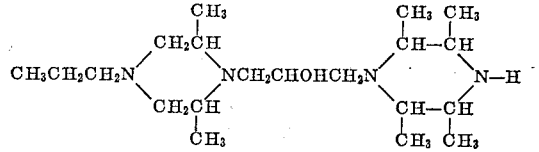

boiling at approximately 160–170° at 0.15 mm. pressure, was obtained in a yield of 26% by the following procedure:

A mixture of approximately equimolar quantities of crude 2,6-dimethyl-4-n-proply-1-(2,3-epoxypropyl)-piperazine and 2,3,5,6-tetramethylpiperazine was allowed to stand at room temperature for two weeks with frequent mixing and then was heated on a water bath for 16 hours. The reaction mixture was extracted with ether and the ethereal extract was dried over solid potassium carbonate. The ether was vacuum evaporated and the residue was vacuum distilled.

(b) Similarly,

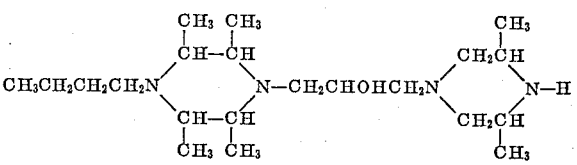

boiling at 160–175° at 0.20 mm. pressure, was obtained from crude 4-n-butyl-2,3,5,6-tetramethyl-1-(2,3-epoxypropyl)-piperazine and 2,6-dimethylpiperazine.

(c) The compound,

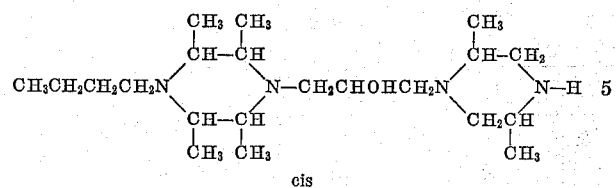

cis boiling at 160–163° at 0.12 mm. pressure, was obtained from crude 4-n-butyl-2,3,5,6-tetramethyl-1-(2,3-epoxypropyl) piperazine and 2,6-dimethylpiperazine by approximately the same procedure. A slight variation in the isolation of the bis-piperazinopropanol involved the addition of sodium hydroxide solution to the reaction mixture before the ether extraction.

(d) The bis-piperazinopropanol, mainly of the structure

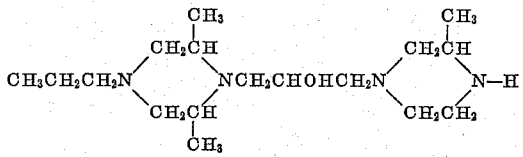

boiling at 154–157° at 0.15 mm., was obtained from 2,6-dimethyl-4-n-propyl-1-(2,3 - epoxypropyl)piperazine and 2-methylpiperazine.

In addition to the foregoing methods of preparation of compounds (III), such compounds may also be prepared by hydrolysis in acid solution of the carbalkoxyaminoalkanol piperazines disclosed in applicants' Patent No. 3,015,657, issued January 2, 1962.

Early in the present work, titrations of the amines were carried out in GH solvent (a solution of ethylene glycol and isopropanol in a ratio of 1/1). In this solvent, only two of the three nitrogens in compounds of the skeleton structure

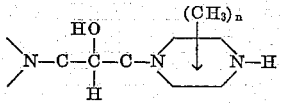

are titrated. In later work, titrations were carried out with perchloric acid in glacial acetic acid, a reagent which titrates all of the nitrogens in compounds of structure (III). The latter reagent was used for all of the titrations in Table C except where otherwise indicated. To avoid confusion, the compounds titrated in GH solvent are listed at the end of Table C. The nitrogen content of these compounds reported as "calculated" should be multiplied by 1.5 to get the total nitrogen present.

*Table C*

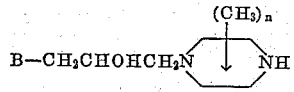

| n | B | B.P., °C. | Pressure, mm. | Nitrogen, percent Calcd. | Nitrogen, percent Found |
|---|---|---|---|---|---|
| 0 | Diethylamino | 129–130 | 0.15 | 19.51 | 19.42 |
| 0 | Diisopropylamino | 199–201 | 23.0 | 17.26 | 16.90 |
| 0 | Di-n-butylamino | 143–145 | 0.20 | 15.48 | 15.60 |
| 0 | Pyrrolidino | 144–146 | 0.20 | 19.70 | 19.96 |
| 0 | Piperidino | 153–156 | 0.50 | 18.48 | 18.35 |
| 0 | 2-methylpiperidino | 150–152 | 0.20 | 17.41 | 17.55 |
| 0 | Methylcyclohexylamino | 162–166 | 0.30 | 16.45 | 15.89 |
| 0 | Morpholino | 158–162 | 0.20 | 18.33 | 18.09 |
| 0 | 4-methylpiperazino | 137–139 | 0.20 | 23.04 | 22.50 |
| 1 | Dimethylamino | 150–154 | 19.0 | 20.87 | 20.57 |
| 1 | Diethylamino | 123–126 | 0.15 | 18.32 | 18.32 |
| 1 | Di-n-propylamino | 132–133 | 0.20 | 16.32 | 15.80 |
| 1 | Pyrrolidino | 132–133 | 0.28 | 18.48 | 18.95 |
| 1 | Piperidino | 152–155 | 0.20 | 17.41 | 17.48 |
| 1 | 3-methylpiperidino | 145–146 | 0.40 | 16.45 | 16.21 |
| 1 | 2,6-dimethylpiperidino | 137–138.5 | 0.45 | 15.60 | 15.39 |
| 1 | Methylcyclohexylamino | 158–163 | 0.20 | 15.60 | 15.20 |
| 1 | Morpholino | 151–153 | 0.15 | 17.26 | 17.76 |
| 1 | 2,6-dimethylmorpholino | 152–154 | 0.60 | 15.50 | 15.95 |
| 1 | 2,6-dimethyl-4-propylpiperazino | 154–157 | 0.15 | 17.90 | 17.98 |
| 1 | 4-methylpiperazino | 139–142 | 0.05 | 21.87 | 21.63 |
| 2[d] | Di-n-butylamino | 150–154 | 0.15 | 14.03 | 13.86 |
| 2[d] | Piperidino | 202–205 | 20.0 | 16.45 | 15.85 |
| 2[d] | 4-methylpiperidino | 150–152 | 0.45 | 15.60 | 15.11 |
| 2[d] | 4-methylpiperazino | 138–140 | 0.30 | 20.74 | 20.35 |
| 2[d] | Morpholino | 152–153 | 0.20 | 16.33 | 16.07 |
| 2[d] | 2,6-dimethylmorpholino | 145–150 | 0.30 | 14.71 | 15.00 |
| 2[e] | Dimethylamino | 155–156 | 19.0 | 19.51 | 19.32 |
| 2[e] | do | 104–108 | 0.32 | 19.51 | 19.23 |
| 2[e] | Diethylamino[a] | 99–100 | 0.15 | 17.26 | 17.54 |
| 2[e] | Diethylamino[b] | 101–102 | 0.05 | 17.26 | 17.36 |
| 2[e] | Diethylamino | 103–106 | 0.11 | 17.26 | 17.61 |
| 2[e] | Diethylamino | 126–128 | 0.80 | 17.26 | 17.00 |
| 2[e] | Di-n-propylamino[b] | 136–139 | 0.90 | 15.48 | 14.92 |
| 2[e] | Di-n-butylamino | 143–145 | 0.10 | 14.03 | 14.21 |
| 2[e] | Pyrrolidino | 142–145 | 0.20 | 17.41 | 17.54 |
| 2[e] | Piperidino | 157–160 | 0.20 | 16.45 | 16.58 |
| 2[e] | 2-methylpiperidino | 143–145 | 0.15 | 15.60 | 15.83 |
| 2[e] | 3-methylpiperidino | 143–145 | 0.50 | 15.60 | 15.70 |
| 2[e] | 4-methylpiperidino | 140–142 | 0.40 | 15.60 | 15.35 |
| 2[e] | 2,6-dimethylpiperidino | 155–156 | 0.90 | 14.82 | 14.53 |
| 2[e] | Methylcyclohexylamino | 160–163 | 0.75 | 14.82 | 14.40 |
| 2[e] | Morpholino | 149–151 | 0.15 | 16.33 | 16.51 |
| 2[e] | 2,6-dimethylmorpholino | 155–157 | 0.75 | 14.72 | 14.82 |
| 2[e] | 4-methylpiperazino | 160–164 | 0.60 | 20.74 | 20.50 |
| 2[e] | 4-n-butylpiperazino | 160–170 | 0.20 | 17.90 | 17.80 |
| 2[e] | 4-n-butyl-2,3,5,6-tetramethylpiperazino | 160–163 | 0.12 | 15.80 | 15.50 |
| 2[f] | Diethylamino | 175–177 | 23.0 | 17.26 | 16.98 |
| 2[f] | 4-methylpiperidino | 142–144 | 0.25 | 15.60 | 15.19 |
| 2[f] | 4-methylpiperazino | 139–140 | 0.05 | 20.74 | 20.51 |
| 2[f] | 4-n-hexyl-2-methylpiperazino | 180–190 | 0.28 | 16.40 | 15.81 |
| 2[f] | 4-n-butyl-2,3,5,6-tetramethylpiperazino | 160–175 | 0.20 | 15.20 | 14.90 |
| 4 | Diethylamino | 137–138 | 0.30 | 15.48 | 15.36 |
| 4 | Diisopropylamino | 198–200 | 20.0 | 14.03 | 13.58 |
| 4 | Di-n-butylamino | 165–168 | 0.15 | 12.83 | 12.40 |
| 4 | Pyrrolidino | 142–144 | 0.75 | 15.60 | 15.95 |

See footnotes at end of table.

Table C—Continued

| n | B | B.P., °C. | Pressure, mm. | Nitrogen, percent Calcd. | Nitrogen, percent Found |
|---|---|---|---|---|---|
| 4 | Piperidino | 140–142 | 0.08 | 14.82 | 14.79 |
| 4 | 2-methylpiperidino | 155–157 | 0.35 | 14.12 | 14.00 |
| 4 | 3-methylpiperidino | 149–150 | 0.40 | 14.12 | 13.72 |
| 4 | 4-methylpiperidino | 140–141 | 0.50 | 14.12 | 13.88 |
| 4 | 2,6-dimethylpiperidino | 152–155 | 0.25 | 13.49 | 13.02 |
| 4 | Methylcyclohexylamino | 158–160 | 0.30 | 13.49 | 12.97 |
| 4 | Morpholino | 158–159 | 0.35 | 14.72 | 14.80 |
| 4 | 4-methylpiperazino | 153–156 | 0.35 | 18.73 | 18.18 |
| 4 | 4-n-propyl-2,6-dimethylpiperazino | 160–170 | 0.15 | 15.80 | 15.45 |
| 2[e] | Di-n-butylamino [a] | 220–226 | 29.0 | [g] 9.35 | [h] 9.15 |
| 2[e] | Morpholino [a] | 223 | 29.5 | [g] 10.90 | [h] 10.42 |
| 2[e] | Morpholino [b] | 221–223 | 28.0 | [g] 10.90 | [h] 10.60 |
| 2[d] | Di-n-butylamino [a] | 207–209 | 29.0 | [g] 9.35 | [h] 9.23 |
| 2[e] | Piperidino [a] | 135–138 | 0.15 | [g] 10.96 | [h] 10.63 |

Note.—All compounds in Table C were prepared by Equation 8 unless otherwise indicated.

[a] Prepared by acid hydrolysis of a compound of structure (IV).
[b] Prepared by basic hydrolysis of a compound of structure (IV).
[c] Titrated with perchloric acid in glacial acetic acid, unless otherwise indicated.
[d] trans-2,5-dimethylpiperazine.
[e] cis-2,5-dimethylpiperazine.
[f] 2,6-(or 3,5-) dimethylpiperazine.
[g] Based on titration of two nitrogens.
[h] Titrated with hydrochloric acid in GH solvent (ethylene glycol and isopropanol, 1/1).

The compounds of structure (III), which can be formed as aforesaid through the hydrolysis of compounds of structure (IV), afford the organic chemist most useful and active intermediates to react with any Lewis acid which acts preferentially with the group >NH rather than with a tertiary amino or secondary alcoholic hydroxyl group. Epihydrinamine, other 1,2-epoxides, 1,2-chlorohydrins, aryl sulfonyl chlorides and aryl isothiocyanates react readily and preferentially with the secondary amino group in (III). Under controlled conditions, aryl isocyanates and high molecular weight acid chlorides, such as diphenylacetyl chloride, react preferentially with the secondary amino group in (III).

Also, many other Lewis acids well known to the organic chemist react preferentially with the secondary amino group in (III). Thus, the compounds of structure (III) afford the organic chemist a synthesis, usually in one step, of a wide variety of useful chemicals.

In addition to the foregoing, compounds of structure (III) are useful as intermediates in the formation of medicinal products such as bronchial dilators, as described in applicants' Patent 3,037,983.

The present invention is concerned only with the compounds of structure (IV) and structure (III) and not with derivatives of either structure. Therefore, data on reactions of these compounds will be given only to demonstrate their utility.

Compounds of structure (III), on reaction with $CH_3(CH_2)_{15}CHOHCH_2Br$, form ether-soluble products of very low water solubility of the structure.

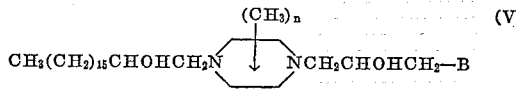

(V)

which, with $Cu^{++}$, form useful fungicidal agents. These copper chelates are particularly useful as agents to protect cotton cloth and cotton cord from mildew. These copper chelates of structure (V) are readily deposited in porous materials, such as textiles. Details of tests with copper chelates of (V) will be set forth hereinafter.

The compounds of structure

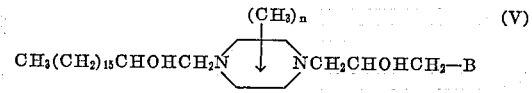

(V)

can be prepared by the reaction of 1-bromo-2-octadecanol and the alkanolamines of structure (III) by prolonged heating at about 100°. A typical synthesis and purification of the product of structure (V) is given below:

EXAMPLE 40

A mixture of 69.6 g. (0.20 mole) of 1-bromo-2-octadecanol and 54.2 g. (0.20 mole) of 1-[3-(di-n-propylamino)-2-hydroxypropyl]-cis-2,5-dimethylpiperazine was heated at approximately 100° for 40 hours in a sealed glass tube. The gummy product was dissolved out of the tube with 75 ml. of hot 12 N hydrochloric acid. The reaction mixture was made basic with sodium hydroxide solution and extracted with approximately 750 ml. of ether. The aqueous layer was discarded and the ether layer was treated with 60 ml. of 12 N hydrochloric acid. A semisolid was obtained. The ether was decanted off and the residue was triturated twice with 300 ml. of ether and twice with 150 ml. of ether. The semisolid then was dissolved in 1 liter of water and the solution was made basic. An oil came to the surface. The oily layer, which contained an appreciable amount of ether, was separated and was treated with 40 ml. of 12 N hydrochloric acid and 375 ml. of ether. Again a semisolid was formed. The ether was decanted off and the semisolid was dissolved in 2 liters of water. The aqueous solution was made basic and an oil came to the surface. This layer was removed and the lower layer was extracted with 375 ml. of ether. This ether layer and the upper layer just previously removed were combined, filtered and dried over sodium potassium carbonate. On evaporation of the ether in a rotary evaporator, 25.3 g. of oil, crude

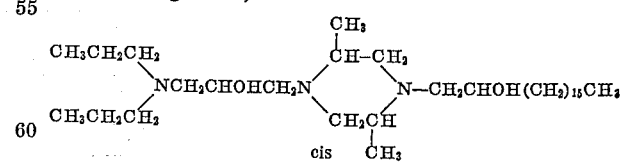

was obtained. (Calcd. for $C_{33}H_{69}N_3O_2$: N, 7.73. Found: N, 8.29.) The nitrogen was determined by titration with perchloric acid in glacial acetic acid solution.

In most of the preparations, removal of the basic nitrogen containing compounds of structure (V) from other ether soluble material, likely the bromohydrin or glycol of octadecene, proved to be quite difficult. Thus, usually the nitrogen analyses were low, even though in some cases additional extractions were made into ether and from the ether back into aqueous hydrochloric acid solution. The great tendency of the high molecular weight alkanolamine hydrochlorides to form aqueous-ether emulsions made quantitative separations difficult.

The high analyses obtained in a few cases probably were due to the tendency of the polyaminoalkanols of structure

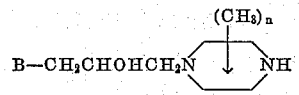

to be carried along with the desired compounds of structure (V). The simpler compound of structure (III) contains all of the nitrogen present in the final product so a small amount of this unreacted product will increase greatly the percent of nitrogen in the final product.

The molecular formulae and analyses of a few compounds of structure (V), prepared by approximately the same method as described in Example 40, are given in Table D:

Table D $$CH_3(CH_2)_{15}CHOHCH_2N\overset{(CH_3)_n}{\underset{}{\bigcirc}}NCH_2CHOHCH_2-B$$

| n | B | Molecular formula | Nitrogen, percent | |
|---|---|---|---|---|
| | | | Calcd. | Found [a] |
| 0 | (n-C$_4$H$_9$)$_2$N | C$_{33}$H$_{69}$N$_3$O$_2$ | 7.78 | 8.33 |
| 1 [b] | O(CH-CH$_2$)(CH-CH$_2$)N with CH$_3$, CH$_3$ | C$_{32}$H$_{65}$N$_3$O$_3$ | 7.78 | 7.69 |
| 2 [c] | (CH$_3$)$_2$N | C$_{29}$H$_{61}$N$_3$O$_2$ | 8.69 | 8.21 |
| 2 [c] | O(CH-CH$_2$)(CH-CH$_2$)N with CH$_3$, CH$_3$ | C$_{33}$H$_{67}$N$_3$O$_3$ | 7.56 | 7.29 |
| 2 [d] | (C$_2$H$_5$)$_2$N | C$_{31}$H$_{65}$N$_3$O$_2$ | 8.21 | 9.22 |
| 2 [d] | O(CH$_2$CH$_2$)(CH$_2$CH$_2$)N | C$_{31}$H$_{63}$N$_3$O$_3$ | 7.99 | 7.01 |
| 2 [d] | CH$_3$N(CH$_2$CH$_2$)(CH$_2$CH$_2$)N | C$_{32}$H$_{66}$N$_4$O$_2$ | 10.60 | 9.62 |
| 2 [e] | (CH$_3$)$_2$N | C$_{29}$H$_{61}$N$_3$O$_2$ | 8.69 | 7.64 |
| 4 | (CH$_3$)$_2$N | C$_{31}$H$_{65}$N$_3$O$_2$ | 8.20 | 7.05 |

[a] Nitrogen titrated with perchloric acid in glacial acetic acid.
[b] 2-methylpiperazine used in synthesis.
[c] Trans-2,5-dimethylpiperazine used in synthesis.
[d] Cis-2,5-dimethylpiperazine used in synthesis.
[e] 2,6-dimethylpiperazine used in synthesis.

The compounds of structure (III) also react with BrCH$_2$CHOH(CH$_2$)$_8$COOCH$_3$ to yield alkanolamino-esters which, on hydrolysis with sodium hydroxide, form sodium salts of structure

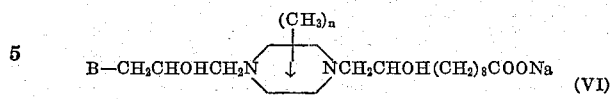

which can be deposited from aqueous solution in cotton cord and cotton cloth. The impregnated cloth and cord, on being treated with Cu(NH$_3$)$_4$SO$_4$ and dried, have relatively insoluble copper chelates dispersed throughout the material. These copper-containing chelates, prepared from compounds of structure (III), form valuable mildew-proofing agents. Details of tests with copper chelates of (VI) will be hereinafter set forth.

Compounds of structure (VI) may be prepared by the following type reactions:

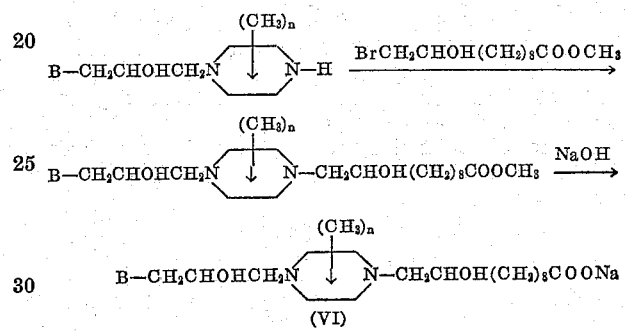

A typical synthesis of a compound of structure (VI) is given below:

EXAMPLE 41

A mixture of 27.0 g. (0.10 mole) of 1-[3-(4-methylpiperazino)-2-hydroxypropyl]-cis - 2,5 - dimethylpiperazine and 29.5 g. (0.10 mole) of methyl 11-bromo-10-hydroxyundecanoate was heated at approximately 100° in an oil bath for 16 hours. The reaction mixture was dissolved in 150 ml. of 6 N hydrochloric acid and diluted with water to 800 ml. On treatment with excess 6 N sodium hydroxide solution, an oil separated. The reaction mixture was extracted twice with 150 ml. portions of ether and the combined ether extracts were treated with 16 ml. of concentrated hydrochloric acid to yield a lower oily layer. The ether was decanted off and the oily layer was triturated four times with 75 ml. of ether. The oily layer was dissolved in approximately 400 ml. of water. On addition of excess sodium hydroxide solution, an oil separated. This oil was dissolved by extraction twice with 150 ml. portions of ether. The combined ether extracts were washed twice with 500 ml. portions of water, filtered and dried over solid potassium carbonate. On evaporation of the ether, the crude polyaminoalkanol ester

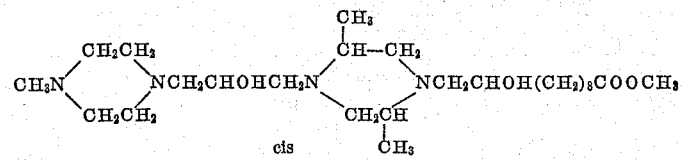

was obtained as an oil. (Calcd. for C$_{25}$H$_{52}$N$_4$O$_4$: N, 11.85%. Found: N, 10.13%.) On saponification with aqueous-alcoholic sodium hydroxide solution, the salt

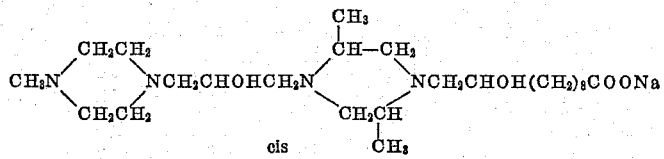

was obtained.

The effectiveness of the copper chelates of (V) and (VI) as fungicidal agents is demonstrated readily by impregnation of cotton cloth and cotton cord with these compounds and by exposure of the impregnated cellulosic material to the fungus, *Chaetomium globosum*. The reasons for the choice of this particular fungus for the test organism are set forth in the American Dyestuff Reporter, 23, 586 (1934); Technical Bulletin No. 726 of the United States Department of Agriculture, page 2 (March 1940).

Details of tests with *Chaetomium globosum* on cotton cloth and cotton cord, impregnated with copper chelates of compounds of structure (V) and controls, not impregnated, are given below.

The basal medium used in the tests contained essential inorganic material and agar dissolved in distilled water. The carbon source for the fungus was the cloth or cord, placed on the surface of the solidified medium in Petri dishes. Inoculum consisted of a spore suspension of *Chaetomium globosum* in distilled water. The inoculum was pipetted uniformly over the surface of the test cloth the test cord. Cultures were incubated at approximately 25°.

A piece of cotton cloth was impregnated with another solution containing approximately 7% by weight of

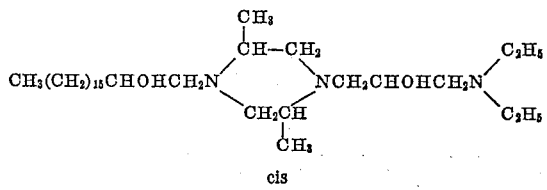

cis and was air dried. The cloth then was immersed in a solution approximately 0.25 N in ammonium hydroxide containing 1 gram of $CuSO_4 \cdot 5H_2O$ in 100 ml. of solution and allowed to dry. It was then washed and again allowed to dry.

The impregnated cloth and a control (a similar piece of cloth, not impregnated with alkanolamine and copper salt) were placed on agar in separate Petri dishes and treated with the suspension of *Chaetomium globosum*, as indicated above.

At the end of four days' incubation, the control cloth was covered with abundant vegetative growth and at the end of two weeks, was completely covered with large perithecia. Deterioration was so far advanced that it was impossible to remove the cloth from the surface by the agar; the cloth, in fact, had been almost completely replaced by fungus growth. The treated cloth, after two weeks, displayed only trace amounts of vegetative growth and a few, widely scattered, small perithecia, with no signs of advanced deterioration.

The breaking strength of a sample of cotton cord was determined by adding water from a graduated cylinder to a container suspended by the cord, until it broke. Pieces of cord from the same ball were immersed in either solutions of compounds of structure (V) containing approximately 7% by weight of (V). After air drying, the pieces of cord were immersed in solutions approximately 0.25 N in ammonium hydroxide and containing 1.0 g. of $CuSO_4 \cdot 5H_2O$ per 100 ml. of solution. The cords were air dried, washed and again air dried. The breaking strength of the impregnated cords then was determined.

The treated cords and untreated cord were placed in separate Petri dishes on the solid medium described above. The inoculum of a suspension of *Chaetomium globosum* was pipetted uniformly over the impregnated cords and control. Incubation at 25° was carried out for 11 days. The cords were dried and three to five determinations of breaking strength were made with each sample. Also, the amount of copper held in each of the impregnated samples were determined. This amount was expressed in percent of total weight of cord, alkanolamine and copper salt.

The data are given below in Table E.

Table E

COMPOUND (V)

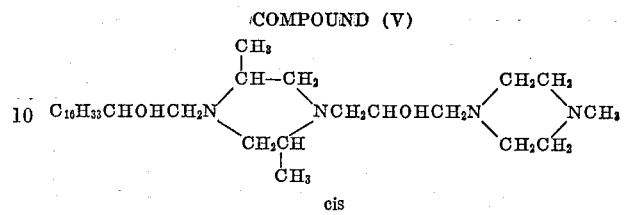

cis

| Breaking strength | Breaking strength after 11 days | Percent copper in cord |
|---|---|---|
| 7,798 g. | 8,075 g. | 0.76 |

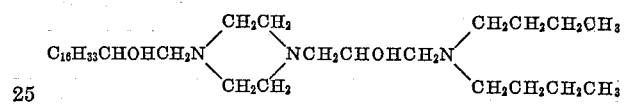

| Breaking strength | Breaking strength after 11 days | Percent copper in cord |
|---|---|---|
| 7,918 g. | 7,627 g. | 0.86 |

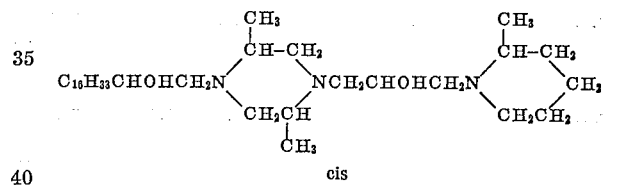

cis

| Breaking strength | Breaking strength after 11 days | Percent copper in cord |
|---|---|---|
| 8,927 g. | 6,887 g. | 0.78 |
| None (control cord) | | |
| 7,714 g. | 1,004 g. | None |

NOTE.—The copper was determined by extraction of the cord with 1.5 N nitric acid, evaporation of the solution, ignition of the residue, solution of the residue in nitric acid, dilution, adjustment of the pH to approximately 6.0, addition of ethylene diamine and spectrophotometric measurements of the color.

In another test, using

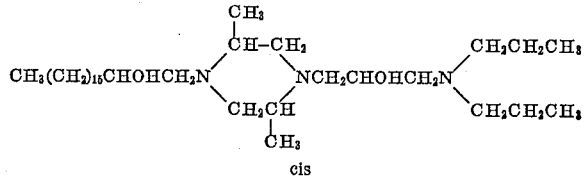

cis to impregnate the cord, the breaking strength of the cord initially was approximately 8110 g. and after 11 days' incubation with *Chaetomium globosum*, the breaking strength of the cord was approximately 8299 g.

The slight increase in breaking strength of two samples of cord, above, is probably due to variations in the cord.

As is noted, the untreated cord lost approximately 85% of its strength. Two pieces of treated cord showed no loss in strength. One piece lost approximately 4% of its strength and another piece of cord lost approximately 23% of its strength.

In another series of tests, with another ball of cord and apparently with a more active culture of *Chaetomium globosum*, an untreated cord with a breaking strength of approximately 5961 g. dropped to approximately 315 g. in 12 days. Two samples of cord were impregnated with

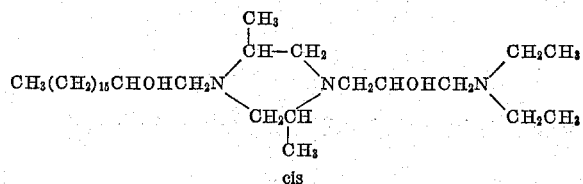

and then with ammoniacal copper sulfate. After 12 days, one sample had a breaking strength of approximately 5551 g. or approximately a loss of 7% in breaking strength and the other sample showed no decrease in strength. As is noted above, the untreated cord lost approximately 95% of its strength.

In another test, a cotton cloth was impregnated with

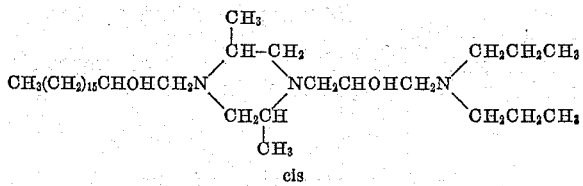

(1.0 g. in 20 ml. of ether solution) and was air dried. The cloth then was immersed in a solution approximately 0.25 normal in ammonium hydroxide and containing 1.0 g. of $CuSO_4 \cdot 5H_2O$ in 100 ml. of solution. It then was washed by dipping ten times in fresh water and was air dried. The copper was found to be approximately 0.48% of the total weight of cloth, alkanolamine and copper salt. The cloth then was immersed for eight days in a beaker into which water was slowly running. After air drying the copper content of the cloth was approximately 0.40%.

Compounds of the structure

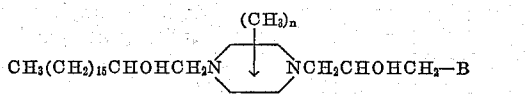

impregnated into cloths, form relatively insoluble chelates when immersed in ammoniacal solutions of $Co^{++}$ and of $Ni^{++}$.

The same general procedure, with slight modification, was used to test the fungicidal effect of copper chelates of compounds of the structure

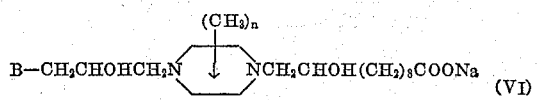

(VI)

in protecting cotton cord from the action of *Chaetomium globosum*. A cord with a breaking strength of 8430 g. was used in these tests.

In each test, the cord, washed with ether to remove any oils which might be present, was immersed in approximately 1% aqueous solution of the compound of structure (VI). The cord was air dried, immersed in a solution approximately 0.25 N in ammonium hydroxide and containing 1.0 g. of $CuSO_4 \cdot 5H_2O$ per 100 ml. of solution. The cord was air dried, washed for one hour in gently running tap water and again air dried.

Treated and untreated cord were placed in separate Petri dishes on the same type solid medium used in the previous tests. As before, the inoculum of a suspension of *Chaetomium globosum* was pipetted uniformly over the impregnated cord and control. Incubation at 25° was carried out for 14 days. The control cord was almost completely disintegrated by the action of the fungus. The breaking strength of this cord was so low it could not be measured.

Data are given below in Table F on treated cords and the control cord. The breaking strength is the average of four or five tests.

*Table F*

COMPOUND (VI)

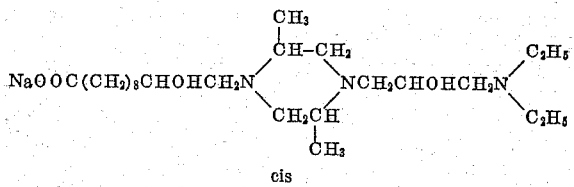

| Breaking strength of cord after 14 days | Copper, percent (in cord) |
|---|---|
| 7,946 g | 0.77 |

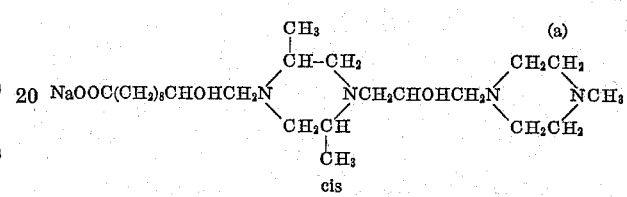

(a)

| Breaking strength of cord after 14 days | Copper, percent (in cord) |
|---|---|
| 8,223 g | 0.75 |

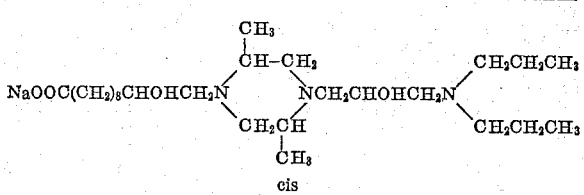

| Breaking strength of cord after 14 days | Copper, percent (in cord) |
|---|---|
| 7,684 g | 0.83 |

(a) On one of the two plates used for the test with this compound, there was at the end of the test period (14 days) an appreciable growth of *Chaetomium globosum*, and in spots practically complete disintegration of the cord. The data reported are the average of four determinations of breaking strength of cord from another plate and from places on this plate where the fungus had not grown.

As is evident in the prolonged test reported just above, the copper chelates of compounds of structure (VI) did not give the cord complete protection from *Chaetomium globosum*, but in five out of six plates there was a maximum loss in breaking strength of less than 10% and in the sixth plate, the growth of fungus was distinctly less than in the control.

A sample of cotton cloth was impregnated with an approximately 1% solution of

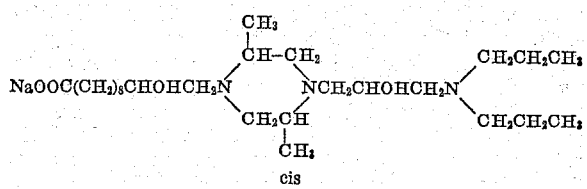

air dried and impregnated with approximately 1%

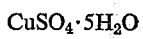

$CuSO_4 \cdot 5H_2O$ in approximately 0.25 N ammonium hydroxide. After air drying, the cloth was washed for one hour in gently running tap water. The copper content of the cloth was 0.41%. On being washed for 3 days in gently running water, the copper content was 0.37%. After one week in running water, the copper content of the cloth was 0.33%.

27

Other uses of the compounds of structure (III), as intermediates for the formation of chelating agents, will occur to those persons skilled in organic synthesis. For example, all of the derivatives of (III), formed by the reaction of of the secondary amino group only, contain from two to four basic nitrogens, each so situated spatially that it is potentially capable of chelating with cations such as $Cu^{++}$, $Co^{++}$, $Ni^{++}$ and $Zn^{++}$, which readily form ammonia complexes.

The compounds formed by reaction of a halohydrin or epoxide with the >NH group of (III) have one hydroxyl group which is two carbons removed from two basic nitrogen and one hydroxyl group which is two carbons removed from one basic nitrogen. In cases when epihydrinamines of structure $$R_2NCH_2CH\overset{O}{\overset{|}{-\!\!\!-\!\!\!-}}CH_2$$

(wherein $R_2$ is a lower alkyl group) react with the >NH group of (III), the following structure is formed:

$$R_2NCH_2CHOHCH_2N\underset{\phantom{x}}{\overset{(CH_3)_n}{\diamond}}NCH_2CHOHCH_2N\diagdown \quad (VII)$$

In the above type compound, each hydroxyl group is two carbons removed on each side from a basic nitrogen atom. In other words, in each compound of structure (VII), two oxygen atoms and four nitrogen atoms are in positions favorable for reaction with cations which form chelates with both oxygen and nitrogen. Also, each nitrogen is two or three carbons removed from another nitrogen, a spatial relationship conducive to chelation.

The products formed by reaction of epihydrinamines of structure $$R_2NCH_2CH\overset{O}{\overset{|}{-\!\!\!-\!\!\!-}}CH_2$$

with $$H-N\underset{\phantom{x}}{\overset{(CH_3)_n}{\diamond}}NCH_2CHOHCH_2-B$$

in which B is an alkylpiperazine coming within the scope of the present invention have the structure $$R_2NCH_2CHOHCH_2N\underset{\phantom{x}}{\overset{(CH_3)_n}{\diamond}}NCH_2CHOHCH_2N\diagdown N-R'$$

(R' being a lower alkyl group) in which there are five nitrogen atoms properly spaced for chelation.

The invention may be embodied in other specific forms without departing from the spirit or essential characteristics thereof. For example, while the member "B" in structure (I) is set forth as being various heterocyclic radicals, such radicals may be substituted without changing the basic nature of the compounds of the instant invention. Merely by way of example, the lower alkyl derivatives of the piperidino radical may be employed. Other modifications will readily suggest themselves to those skilled in the art. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:
1. A compound of the structure

$$B-CH_2CHOHCH_2N\underset{\phantom{x}}{\overset{(CH_3)_n}{\diamond}}N-X \quad (I)$$

wherein B is a member of the group consisting of mor-

28 pholino, pyrrolidino, piperidino, methylcyclohexylamino, piperazino of the structure $$Y-N\underset{\phantom{x}}{\overset{(CH_3)_n}{\diamond}}N- \quad (II)$$

wherein Y is an alkyl radical of 1 to 6 carbons, and $$N\diagdown \overset{R}{\underset{R'}{\diagup}}$$

wherein R and R' each is an alkyl radical of 1 to 4 carbons; wherein X is a member of the group consisting of H and CHO; and $n$ is a number from 0 to 4 both in structures (I) and (II); no carbon in the piperazine rings of structures (I) and (II) having more than one methyl group attached to it.

2. A compound selected from the group of compounds consisting of (1) compounds of the structure $$B-CH_2CHOHCH_2N\underset{\phantom{x}}{\overset{(CH_3)_n}{\diamond}}NCHO$$

wherein B is a member of the group consisting of morpholino, pyrrolidino, piperidino, monomethylpiperidino, 2,6-dimethylpiperidino, methylcyclohexylamino, $$N\diagdown \overset{R}{\underset{R'}{\diagup}}$$

wherein R and R' each is an alkyl radical of 1 to 4 carbons; and $n$ is a number from 0 to 4; no carbon in the piperazine ring having more than one methyl group attached to it; and (2) the therapeutically acceptable acid addition salts of compounds (1).

3. A compound of the structure $$B-CH_2CHOHCH_2N\underset{\phantom{x}}{\overset{(CH_3)_n}{\diamond}}NH \quad (I)$$

wherein B is a member of the group consisting of morpholino, pyrrolidino, piperidino, methylcyclohexylamino, piperazino of the structure $$Y-N\underset{\phantom{x}}{\overset{(CH_3)_n}{\diamond}}N- \quad (II)$$

wherein Y is an alkyl radical of 1 to 6 carbons, and $$N\diagdown \overset{R}{\underset{R'}{\diagup}}$$

wherein R and R' each is an alkyl radical of 1 to 4 carbons; and $n$ is a number from 0 to 4 both in structures (I) and (II); no carbon in the piperazine rings of structures (I) and (II) having more than one methyl group attached to it.

4. The compound $$CH_3-N-CH_2CHOHCH_2N\diagdown \overset{\overset{CH_3}{\overset{|}{CH-CH_3}}}{\underset{\underset{CH_3}{\overset{|}{CH_2CH}}}{\diagup}}NCHO$$

5. A therapeutically acceptable acid addition salt of the compound of claim 4.

6. The compound

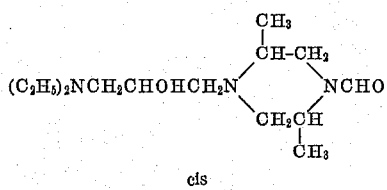

cis

7. A therapeutically acceptable acid addition salt of the compound of claim 6.

8. The compound

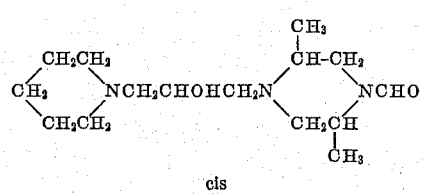

cis

9. A therapeutically acceptable acid addition salt of the compound of claim 8.

10. The compound

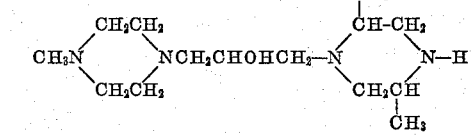

cis

11. The compound

cis

References Cited by the Examiner
UNITED STATES PATENTS

| | | | |
|---|---|---|---|
| 2,794,804 | 6/57 | Kushner et al. | 260—268 |
| 2,948,722 | 8/60 | Biel | 260—268 X |
| 2,948,746 | 8/60 | Stuehmer et al. | 260—268 X |
| 3,015,657 | 1/62 | Geschickter et al. | 260—268 X |

IRVING MARCUS, *Primary Examiner.*

DUVAL T. McCUTCHEN, NICHOLAS S. RIZZO,
*Examiners.*

UNITED STATES PATENT OFFICE
CERTIFICATE OF CORRECTION

Patent No. 3,190,883                            June 22, 1965

Charles F. Geschickter et al.

It is hereby certified that error appears in the above numbered patent requiring correction and that the said Letters Patent should read as corrected below.

Column 1, lines 16 to 19, for the right-hand portion of formula (I) reading column 2, line 44, for "reaction" read -- reactions --; column 5, lines 71 to 75, for the lower right-hand portion of the formula reading

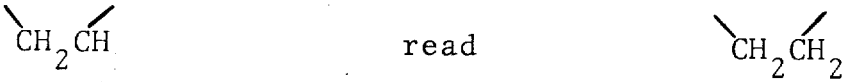

column 7, line 38, for "216-210°" read -- 216-219° --; column 9, Table A, second column, line 31 thereof, for "do" read -- Morpholino[a] --; same table, third column, line 31 thereof, for "182°2185°" read -- 182°-185° --; same table, second column, line 40 thereof, for "do" read -- Diethylamino --; same table, footnote "d" thereof, for "6-methyl" read -- 6-dimethyl --; column 11, lines 1 and 7, for "mixed with some of the 2-methyl isomer,", each occurrence, read -- (mixed with some of the 2-methyl isomer) --; column 14, line 2, for "wth" read -- with --; column 18, Table C, second column, lines 31 to 33 thereof, for "Dielhylamino", each occurrence, read -- Diethylamino --; column 20, line 52, for "sodium" read -- solid --; column 22, line 66, for "11,85%" read -- 11.85% --; column 23, line 22, for "the" read -- and --; line 50, for "by" read -- of --; same column 23, line 75, for "were" read -- was --; column 26, line 46, for "diisntegration" read -- disintegration --; column 27, line 5, strike out "of".

Signed and sealed this 29th day of March 1966.

(SEAL)
Attest:

ERNEST W. SWIDER                        EDWARD J. BRENNER
Attesting Officer                        Commissioner of Patents